(No Model.)
F. J. STIMSON.
SPROCKET WHEEL ATTACHING DEVICE.
No. 535,425. Patented Mar. 12, 1895.
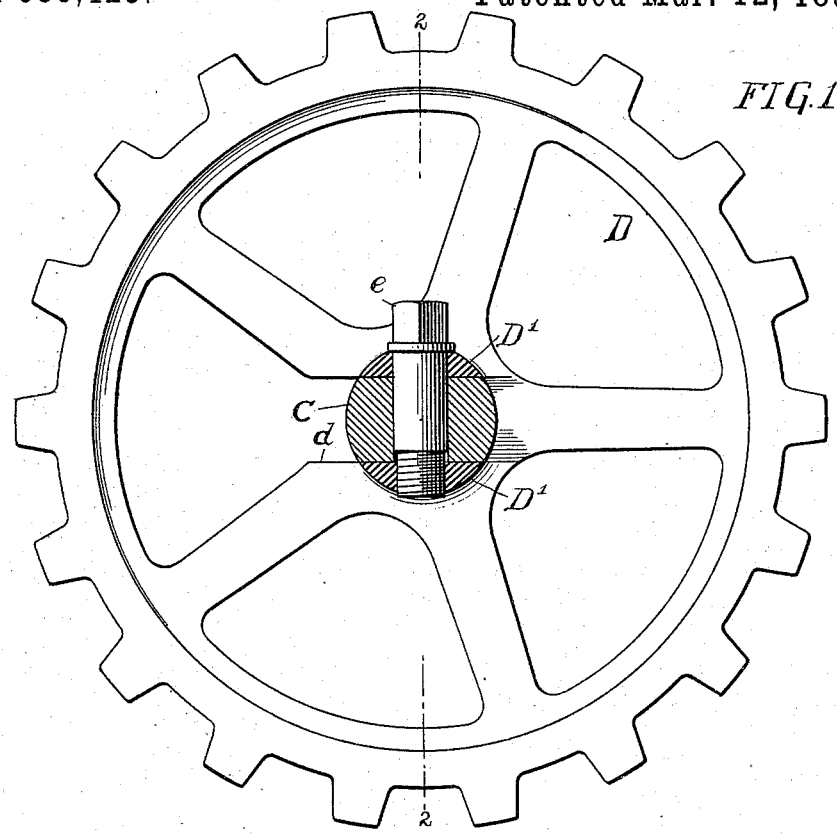
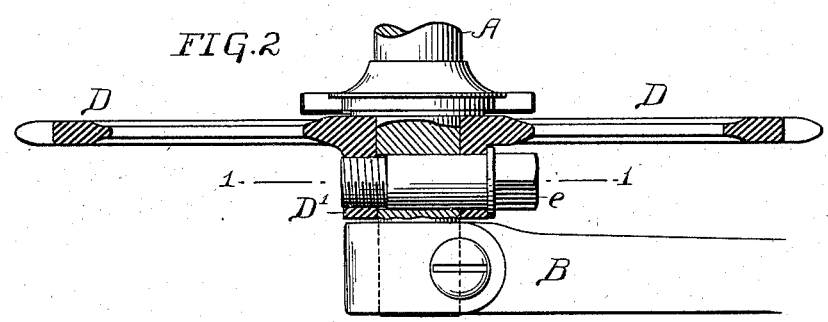
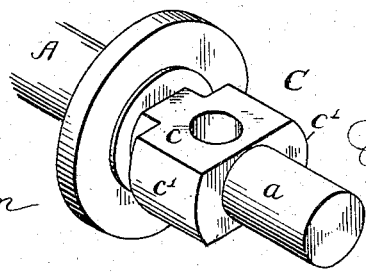

UNITED STATES PATENT OFFICE.

FREDERICK J. STIMSON, OF NEW YORK, N. Y.

SPROCKET-WHEEL-ATTACHING DEVICE.

SPECIFICATION forming part of Letters Patent No. 535,425, dated March 12, 1895.

Application filed October 13, 1894. Serial No. 525,778. (No model.)

*To all whom it may concern:*

Be it known that I, FREDERICK J. STIMSON, a citizen of the United States, and a resident of the city of New York and State of New York, have invented a certain new and useful Improvement in Means for Attaching Sprocket-Wheels to Crank-Axles, &c., of which the following is a full, clear, and exact description, reference being had to the accompanying drawings, forming part of this specification.

My invention relates to the securing of sprocket wheels of bicycles upon the crank axles, and has for its object to provide a construction of such character as to enable the rider to readily place upon the axle a sprocket wheel of any desired diameter without disassembling any part of the crank hanger or bearings.

Sprocket wheels, in bicycle constructions, are usually secured to the crank axle in such manner that the average rider cannot readily substitute a higher or lower gear sprocket wheel and one of different diameter for the one in place upon his machine, as the construction is such as to necessitate the removal of the crank and the exercise of some mechanical skill in securing the sprocket wheel in place. To enable the rider and others to readily adjust sprocket wheels of various diameters to the crank axle I provide a squared or rectangular portion upon the axle and provide a radial slot or opening in one side of the hub of the sprocket wheel, so that the latter may be readily slipped on and then secured in position, the wheel being held to the axle by means of a locking screw passing in a diametral line through the hub of the wheel and the axle.

In the accompanying drawings:—Figure 1 is a sectional elevation, on the line 1—1 Fig. 2, of a sprocket wheel and crank axle, illustrating my invention. Fig. 2 is a transverse sectional view of the same, on the line 2—2 Fig. 1, and Fig. 3 is a detached perspective view of one end of the crank axle.

Referring to the drawings A represents a crank axle provided at its extreme end with a cylindrical portion, a, for the attachment of the crank, B, which is secured to the axle in any suitable manner.

Formed integral with the axle, at a point just within the cylindrical portion, a, is a block, C, having two flattened surfaces, c, at diametrically opposite points, the edges, c', of the block being rounded on the same curved line with that forming the circumference of the hub of the sprocket wheel.

The sprocket wheel, D, is provided with a segment of a hub, D', having an elongated recess or opening, d, formed by cutting away the central portion of the hub to a point beyond the inner end of the spokes of the wheel, the sides of the opening, d, being parallel to each other and at a distance from each other equal to the thickness of the block, C, the circumference of the hub being on the same curved line as the sides, c', of the block, C, so that when the hub of the wheel is fitted upon the block the two curved surfaces will be in line with each other and form, to all appearances, a solid hub.

The block, C, and the hub, D', are provided with suitable openings for the passage of a securing srew, e, which passes through the hub and block in a diametral line, as shown.

To remove the sprocket wheel, D, from the crank axle it is first necessary to remove the pedal at the end of the crank, B, which is always readily accomplished, and after the removal of the locking screw, e, the wheel is moved away from the block, C, in a radial line so that the space between two of the spokes of the wheel will be in line with the crank axle. This space between the spokes of the wheel is sufficiently large to permit the turning of the wheel over the crank, B, so that it may be readily removed from the axle without removing the crank.

It is clear that a solid wheel as contradistinguished from a spoked sprocket wheel may be employed, in which case, however, an opening must be provided in the wheel at the mouth of the slot, d, sufficiently large to allow of the turning and passage of the wheel over the end of the axle and over the crank arm.

The various sized wheels of the construction herein described are to be supplied with the machines so that the rider may readily substitute a wheel having a greater or less number of teeth to decrease or increase the speed of the machine.

Having thus described my invention, what I claim, and desire to secure by Letters Patent, is—

1. In combination, a sprocket wheel having a radially arranged opening extending from its hub to an enlarged open space provided in the body of the wheel, a crank axle having a block adapted to said opening, and a securing bolt extending through the wheel hub and the axle, substantially as specified.

2. In combination, a sprocket wheel having in its body portion an enlarged opening to permit the turning and passage of the wheel over the axle and crank arm, a divided hub having a radially disposed slot extending through the hub and wheel to said enlarged opening, the crank axle, a block thereon adapted to said radially disposed slot, and means for securing the hub to the block, substantially as specified.

3. The combination of the spoked sprocket wheel, a divided hub thereon, there being a radial opening extending through the hub and wheel to a space between two of the spokes, a crank axle having a block adapted to said opening, said block having its opposite side walls curved upon a line corresponding to the curvature of the circumference of the wheel hub, and means for securing the hub to the block, substantially as specified.

In witness whereof I have hereunto set my hand this 6th day of October, A. D. 1894.

FREDERICK J. STIMSON.

Witnesses:
E. P. JOHNSON,
F. W. MUSGRAVE.